UNITED STATES PATENT OFFICE.

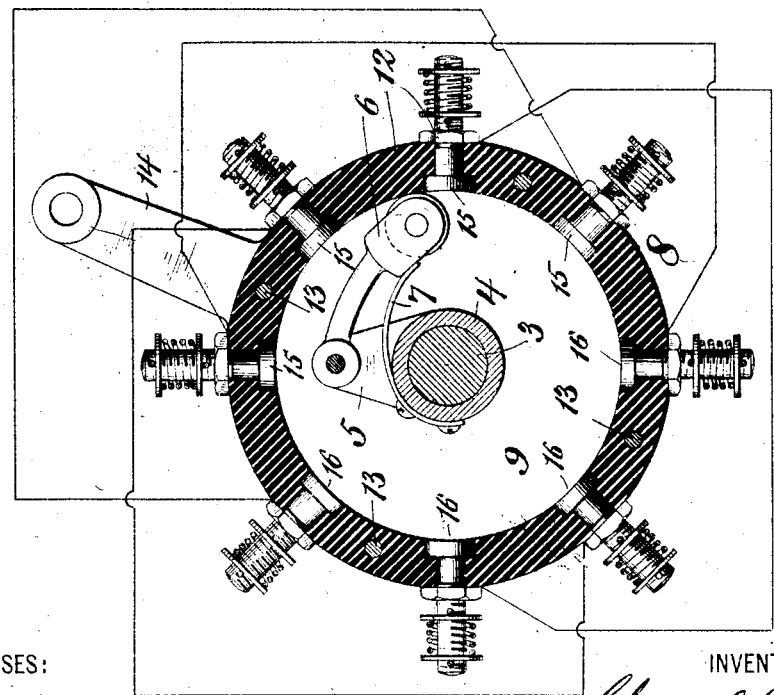

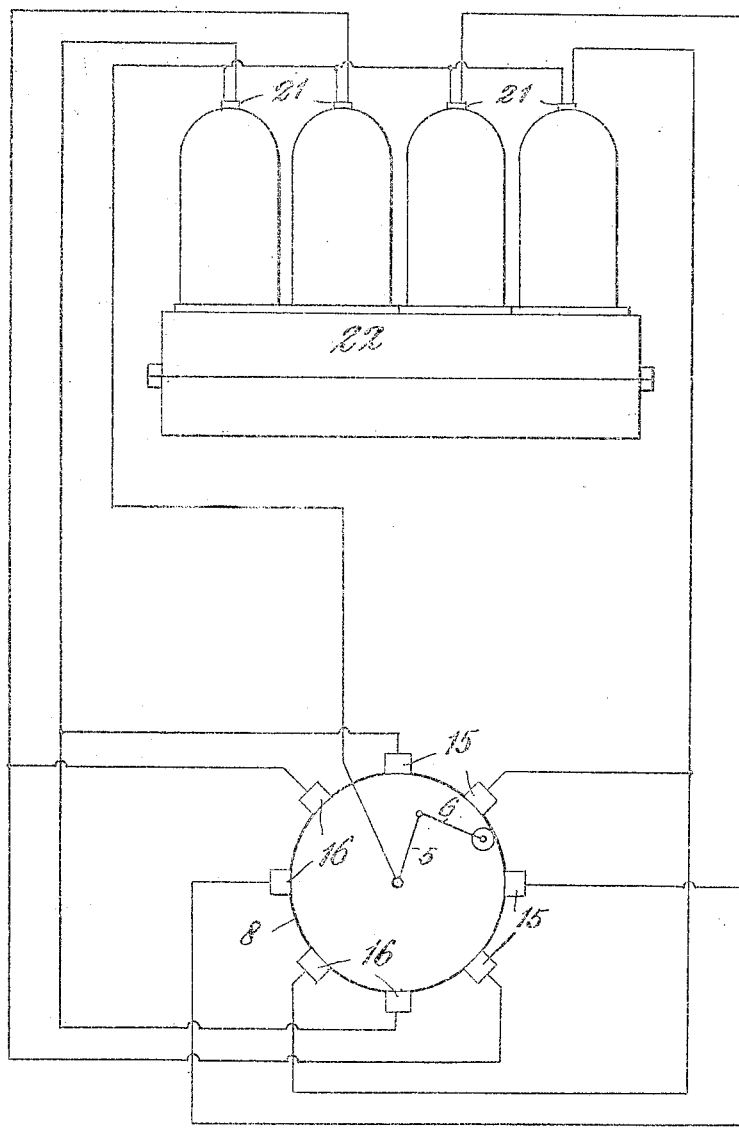

CHARLES A. CARLSON, OF NEW YORK, N. Y.

CIRCUIT-CONTROLLER.

No. 859,430.

Specification of Letters Patent.

Patented July 9, 1907.

Application filed March 8, 1906. Serial No. 304,819.

*To all whom it may concern:*

Be it known that I, CHARLES A. CARLSON, a citizen of the United States of America, and a resident of the borough of Brooklyn, of the city of New York, county of Kings and State of New York, have invented certain new and useful Improvements in Circuit-Controllers, of which the following is a specification, reference being had to the accompanying drawings, forming a part thereof.

My invention relates to improvements in circuit controllers, and particularly to circuit controllers of the nature employed in connection with the sparking mechanism of multi-cylinder internal combustion engines.

My invention consists first, in a circuit controller comprising a rotatable trailer and an inclosing casing within which the trailer is mounted, the said casing having bearings upon both sides of said trailer, second, in certain details of construction and novel combination of parts, as will hereinafter be more fully set forth; and third, in an improved construction having more than one series of contact points, the respective contact points of the several series being electrically connected.

The objects of my invention are to improve and simplify circuit controllers employed for the purpose described; to provide such an extent and location of bearing surface as to prevent the parts from becoming worn, with the result that the parts would become loose, and poor contact be made, as has been common in the past; to entirely inclose the trailer within a practically dirt-proof chamber, so as to prevent dirt from working in and clogging up the parts; and to provide a simple and compact arrangement whereby the circuit controller may be run at a relatively slow speed.

I will now describe an embodiment thereof, referring to the accompanying drawings to illustrate the same, and will then point out the novel features in claims.

In the drawings—Figure 1 is a view in central transverse section through a circuit controller embodying my invention. Fig. 2 is a view in central longitudinal section through the same. Fig. 3 is a diagrammatic view showing the circuit controller electrically connected with the spark plugs of an internal combustion engine.

3 designates a shaft upon which is rigidly secured a bushing 4. This bushing is provided with an arm 5, to which a trailer 6 is pivotally connected, the said trailer being given a tendency to move outwardly by means of a leaf spring 7.

8 designates the casing as a whole, which is freely mounted upon the said bushing 4, the said casing inclosing a chamber 9 containing the trailer. 6. The casing comprises two disks 10 of electrically non-conductive material, arranged upon opposite sides of the trailer 5, two flanges 11 11 adjacent the outer faces of the said disks, and having a bearing upon the bushing 4, and a ring 12 of electrically non-conductive material, arranged between the two disks 10, 10. Bolts 13 serve to secure the disks 10, flanges 11 and ring 12 together.

One of the flanges 11 is provided with an arm 14, by which the casing 8 may be manipulated, it being understood that the casing is ordinarily held stationary, while the trailer and shaft upon which it is mounted revolve; the casing, however, being permitted limited rotative movements in either direction, through movements given to the operating arm 14, so as to relatively advance or retard the position thereof with respect to a revolution of the shaft 3.

The ring 12 supports a plurality of contact points 15 16. The contact points 15 and 16 are precisely alike, but comprise two series, the points of one series being electrically connected respectively with corresponding points of the other series. The wires which connect the opposite contact points are preferably located in grooves 17 arranged between the outer faces of the ring 12 and the inner faces of the disk 10, such wires being perfectly insulated by the fact that both the disks 10 and ring 12 are of insulating material.

The circuit controller herein is shown with eight contact points, four for each series. The usual circuit controller for a four-cylinder engine of the four-cycle type has four contact points, and is arranged with a 2 to 1 ratio with respect to the main shaft of the engine, that is to say, the circuit controller revolves once for every twice that the main shaft revolves. Such an arrangement gives a spark in each cylinder, once in every other revolution, at a point one half of a revolution ahead of the spark in another cylinder, *i. e.*, a spark at every half revolution in the various cylinders progressively.

My present circuit controller is similarly arranged for a four-cylinder engine of the four-cycle type, but it is provided with eight contact points, of which the opposite contact points are electrically connected together, either one of such oppositely arranged contact points being thus adapted to produce a spark in the same cylinder. This arrangement is illustrated in Fig. 3 of the drawings, the spark plugs 21 of the engine 22 being shown as electrically connected in multiple with opposite contact points of the circuit controller. The circuit controller may then be connected with the drive shaft of the engine at a ratio of 4 to 1, instead of 2 to 1, so that it will run at only one-half the usual speed. This is a great advantage in high speed engines, as it will give a slower and more sure contact at high speeds.

In the drawings, 18 designates a portion of a shaft which may be conisdered the drive shaft of the engine, or a shaft revolving synchronously therewith, and 19 and 20 gear wheels mounted respectively on the shafts 18 and 3, having a speed or ratio of 4 to 1.

The number of the contact points will be, of course, varied in accordance with the number of cylinders and class of engine provided, and while I have shown two series of contact points employed, a greater number of series may be employed if desired, the speed ratio of the circuit controller being properly proportioned, as will be readily understood.

The construction of the circuit controller with more than one set of contact points and with the individual contact points of one set in electrical connection with corresponding points of another set by means of wires contained in the grooves 17, results in an extremely simple and compact device in which there is practically no liability of cross contacts being made through defective insulation and the danger of the connections becoming broken is reduced to a minimum.

What I claim is:

1. A circuit controller comprising a bushing having a trailer connected thereto, two electrically non-conductive disks upon said bushing, one on each side of said trailer, two flanges arranged outside of the said disks and each having a bearing upon the bushing, a contact bearing ring between the said disks, and means securing disks, flanges and ring together.

2. A circuit controller comprising a bushing having a trailer connected thereto, two electrically non-conductive disks upon said bushing, one on each side of said trailer, two flanges arranged outside of the said disks and each having a bearing upon the bushing, a ring between the said disks, said ring comprising an annulus of electrically non-conductive material and contact points carried thereby, wires connecting certain of said contact points together, located in grooves between said disks and said ring, and means securing disks, flanges and ring together.

CHARLES A. CARLSON.

Witnesses:
D. HOWARD HAYWOOD,
LYMAN S. ANDREWS, Jr.